United States Patent
Kitamura et al.

(10) Patent No.: US 11,789,303 B2
(45) Date of Patent: Oct. 17, 2023

(54) DISPLAY DEVICE

(71) Applicant: Japan Display Inc., Tokyo (JP)

(72) Inventors: Koji Kitamura, Tokyo (JP); Yoshihide Ohue, Tokyo (JP); Kentaro Okuyama, Tokyo (JP); Hiroya Morimoto, Tokyo (JP); Masato Kesho, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/747,025

(22) Filed: May 18, 2022

(65) Prior Publication Data

US 2022/0373838 A1 Nov. 24, 2022

(30) Foreign Application Priority Data

May 20, 2021 (JP) ................. 2021-085330

(51) Int. Cl.
*G02F 1/1333* (2006.01)
*G02F 1/1362* (2006.01)
*G02F 1/1339* (2006.01)
*G02F 1/1335* (2006.01)
*G02F 1/1345* (2006.01)
*G02F 1/133* (2006.01)

(52) U.S. Cl.
CPC ...... *G02F 1/133388* (2021.01); *G02F 1/1345* (2013.01); *G02F 1/13394* (2013.01); *G02F 1/13396* (2021.01); *G02F 1/133345* (2013.01); *G02F 1/133512* (2013.01); *G02F 1/136286* (2013.01); *G02F 1/13306* (2013.01); *G02F 2203/01* (2013.01)

(58) Field of Classification Search
None
See application file for complete search history.

(56) References Cited

U.S. PATENT DOCUMENTS

| 2008/0123032 A1* | 5/2008 | Taniguchi ......... G02F 1/133555 349/113 |
| 2011/0183451 A1* | 7/2011 | Tanaka ............. G02F 1/133512 438/30 |
| 2012/0002142 A1* | 1/2012 | Asaoka ............ G02F 1/133512 445/24 |

(Continued)

FOREIGN PATENT DOCUMENTS

JP 2019-219565 A 12/2019

*Primary Examiner* — Shan Liu
(74) *Attorney, Agent, or Firm* — Michael Best & Friedrich LLP

(57) ABSTRACT

A display device includes a display region, a peripheral region around the display region, a sealing portion provided in the peripheral region to seal a liquid crystal layer, and a liquid crystal supply portion provided at a part of the sealing portion and interconnecting an outside of the sealing portion and the display region. The peripheral region includes a first peripheral region which is provided between the display region and the sealing portion and from which an insulating film is removed and a second peripheral region which is provided between the display region and the sealing portion and in which the insulating film covering a circuit is formed. A light blocking film arranged so as to straddle the first and second peripheral regions and extending linearly in an extending direction of a boundary between the first and second peripheral regions is formed on a substrate.

7 Claims, 14 Drawing Sheets

(56) References Cited

U.S. PATENT DOCUMENTS

| | | | |
|---|---|---|---|
| 2012/0099061 A1* | 4/2012 | Lee | H01J 11/44 349/110 |
| 2014/0009711 A1* | 1/2014 | Tomioka | G02F 1/134363 349/123 |
| 2015/0185539 A1* | 7/2015 | Senokuchi | G02F 1/133308 257/40 |
| 2021/0096407 A1 | 4/2021 | Fukuoka et al. | |

* cited by examiner

DISPLAY DEVICE

CROSS REFERENCE TO RELATED APPLICATIONS

The present application claims priority to Japanese Patent Application No. 2021-85330 filed on May 20, 2021, the disclosure of which is incorporated herein by reference.

TECHNICAL FIELD OF THE INVENTION

The present invention relates to a display device using a liquid crystal layer.

BACKGROUND OF THE INVENTION

As a method of manufacturing a display device using a liquid crystal layer, a technology of manufacturing a display device in which liquid crystal is enclosed by supplying the liquid crystal between substrates facing each other has been known (see Japanese Unexamined Patent Application Publication No. 2019-219565 (Patent Document 1)).

SUMMARY OF THE INVENTION

In the case of the method of enclosing liquid crystal between substrates by supplying the liquid crystal between the substrates facing each other, an opening used as an inlet port of the liquid crystal is provided at a part of a sealing portion configured to prevent the liquid crystal supplied between the substrates from leaking outside. By bringing the liquid crystal into contact with the opening in a vacuum atmosphere and then returning the pressure around the substrates to an ordinary pressure, the liquid crystal is enclosed into the space surrounded by the sealing portion by the pressure difference between the pressure inside the space surrounded by the sealing portion and the atmospheric pressure.

However, the study by the inventors of the present application revealed that there was the problem that affected the performance of the display device when the liquid crystal was enclosed by the method mentioned above. For example, if a member that obstructs the flow of the liquid crystal is present in the space surrounded by the sealing portion when the liquid crystal is supplied from the opening mentioned above, a large number of fine bubbles are generated in the liquid crystal in some cases. If these fine bubbles remain, the display performance of the display device will be affected.

From the viewpoint of suppressing the generation of fine bubbles described above, the inventors of the present application considered the structure in which the cross-sectional area of the supply passage of the liquid crystal was widened in the vicinity of the inlet port of the liquid crystal. As a result, it was confirmed that the generation of bubbles could be suppressed, but the problem that the boundary between the widened region and other regions became conspicuous enough to be visually recognizable when the cross-sectional area of the supply passage of the liquid crystal was widened was newly found.

An object of the present invention is to provide a technology capable of improving the performance of the display device.

Means for Solving the Problem

The display device according to an aspect of the present invention includes a display region, a peripheral region around the display region, a first substrate, a second substrate facing the first substrate, a liquid crystal layer arranged between the first substrate and the second substrate and containing liquid crystal, a plurality of signal wirings formed on the first substrate and transmitting a drive signal for driving the liquid crystal, a first insulating film arranged between the first substrate and the second substrate and covering the plurality of signal wirings, a plurality of first spacer members arranged between the first insulating film and the second substrate in the display region and maintaining a gap between the first substrate and the second substrate, a sealing portion provided in the peripheral region between the first substrate and the second substrate to seal the liquid crystal layer, and a liquid crystal supply portion provided at a part of the sealing portion and interconnecting an outside of the sealing portion and the display region. In a plan view seen from a side of the second substrate, the peripheral region has a first side, a second side on an opposite side of the first side, a third side intersecting with the first side, and a fourth side on an opposite side of the third side. The liquid crystal supply portion is provided along the first side of the peripheral region. The peripheral region includes a first peripheral region which is provided between the display region and the sealing portion and from which the first insulating film is removed and a second peripheral region in which a first circuit connected to the plurality of signal wirings is arranged and the first insulating film covering the first circuit is formed. A first light blocking film arranged so as to straddle the first peripheral region and the second peripheral region and extending linearly along an extending direction of a boundary between the first peripheral region and the second peripheral region is formed on the second substrate.

BRIEF DESCRIPTIONS OF THE DRAWINGS

DESCRIPTIONS OF THE PREFERRED EMBODIMENTS

Figure 1:
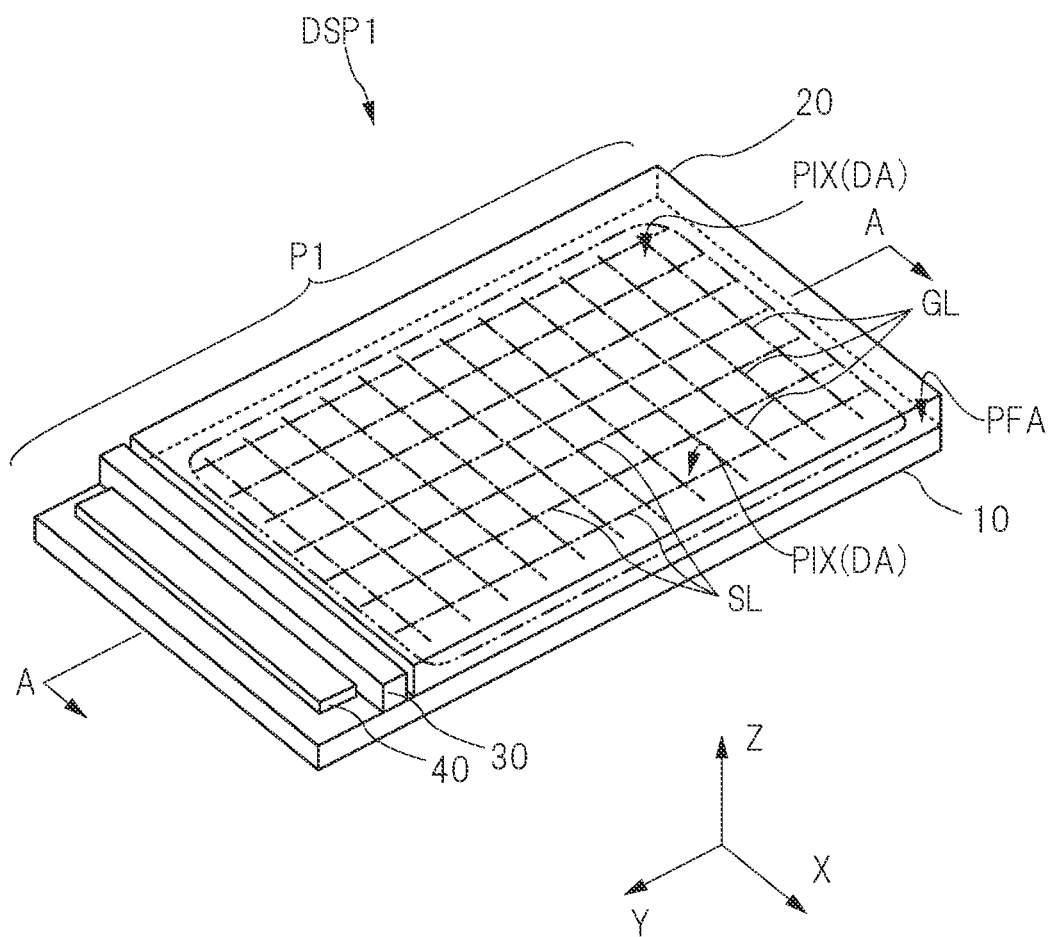
FIG. 1 is a perspective view showing an example of a display device according to an embodiment.

Hereinafter, each embodiment of the present invention will be described with reference to the accompanying drawings. Note that the disclosure is mere an example, and it is a matter of course that any alteration that is easily made by a person skilled in the art while keeping a gist of the present invention is included in the range of the present invention. In addition, the drawings schematically illustrate a width, a thickness, a shape, and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

In the following embodiment, a liquid crystal display device configured to display various images in a display region will be described as an example of a display device having a liquid crystal layer.

Also, a liquid crystal display device is a device that forms a display image by changing the orientation of molecules contained in the liquid crystal layer, but requires a light source. In the present embodiment, a display device in which a light source is provided on the side of a display panel including a liquid crystal layer will be described as an example. However, there are various modifications of the embodiment described below, and for example, the technology described below can be applied to a liquid crystal display device in which a light source is arranged on the back side of the display panel.

<Configuration of Display Device>

Figure 2:
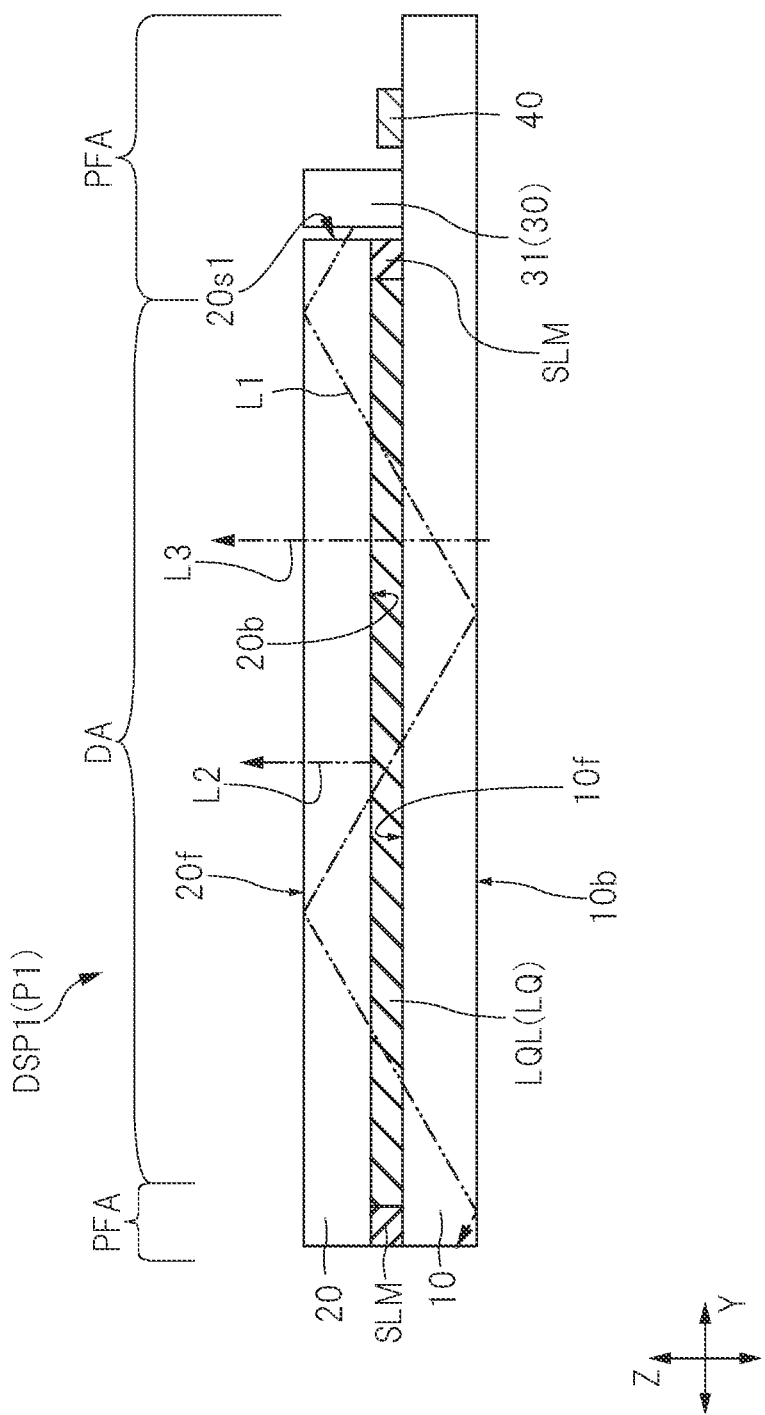
FIG. 2 is a cross-sectional view taken along the line A-A in FIG. 1.

First, a configuration of the display device will be described. FIG. 1 is a perspective view showing an example of the display device according to the present embodiment. In FIG. 1, the boundary between a display region DA and a peripheral region PFA is shown by an alternate long and two short dashes line. Further, in FIG. 1, a part of the signal wiring for transmitting the signal for driving the liquid crystal (specifically, a gate line GL and a source line SL) in the circuit provided in a display device DSP1 is schematically shown by an alternate long and short dash line. In the description with reference to the following drawings including FIG. 1, the direction along the thickness direction of the display device DSP1 is defined as the Z direction, the extending direction of one side of the display panel P1 in the X-Y plane orthogonal to the Z direction is defined as the X direction, and the direction intersecting with the X direction is defined as the Y direction. FIG. 2 is a cross-sectional view taken along the line A-A in FIG. 1.

As shown in FIG. 1, the display device DSP1 of the present embodiment includes a display panel P1 having a substrate (array substrate) 10, a substrate (counter substrate) 20, a side light source device 30, and a drive circuit 40. The display device DSP1 may include, for example, a control circuit, a flexible substrate connected to the display panel P1, a housing, and the like, in addition to the parts provided in the display panel P1 shown in FIG. 1. In FIG. 1, illustration of the parts other than the display panel P1 is omitted. The display device DSP1 has the display region DA in which an image is formed in accordance with an input signal supplied from outside and the peripheral region (frame region) PFA around the display region DA. Although the display region DA of the display device DSP1 shown in FIG. 1 is a quadrangle, the display region may have a shape other than a quadrangle such as a polygon or a circle. The display region DA is an effective region in which the display device DSP1 displays an image on the display surface in a plan view. Each of the substrates 10 and 20 is located at a position overlapping with the display region DA in a plan view. Each of the side light source device 30 and the drive circuit 40 is mounted on the substrate 10.

As shown in FIG. 2, the display device DSP1 includes the substrate 10 and the substrate 20 bonded so as to face each other with interposing a liquid crystal layer LQL therebetween. The substrate 10 and the substrate 20 are arranged in the Z direction which is the thickness direction of the display device DSP1. In other words, the substrate 10 and the substrate 20 face each other in the thickness direction (Z direction) of the display device DSP1. The substrate 10 has a front surface (main surface, surface) 10f facing the liquid crystal layer LQL (and the substrate 20). Further, the substrate 20 has a back surface (main surface, surface) 20b facing the front surface 10f of the substrate 10 (and the liquid crystal layer LQL). The substrate 10 is an array substrate in which a plurality of transistors (transistor elements) as switching elements (active elements) Tr (see FIG. 5) are arranged in an array. Also, the substrate 20 is a substrate provided on the side closer to the display surface. The substrate 20 can be restated as a counter substrate in the sense that it is a substrate arranged so as to face the array substrate.

The liquid crystal layer LQL containing liquid crystal LQ is located between the front surface 10f of the substrate 10 and the back surface 20b of the substrate 20. The liquid crystal layer LQL is an optical modulation element. The display device DSP1 has a function of modulating the light passing therethrough by controlling the state of the electric field formed around the liquid crystal layer LQL via the switching element described above. The display region DA on the substrate 10 and the substrate 20 is superimposed on the liquid crystal layer LQL as shown in FIG. 2.

Further, the substrate 10 and the substrate 20 are adhered to each other via a sealing portion (sealing material) SLM. As shown in FIG. 1 and FIG. 2, the sealing portion SLM (see FIG. 2) is arranged in the peripheral region PFA so as to surround the display region DA. The liquid crystal layer LQL is present inside the sealing portion SLM as shown in FIG. 2. The sealing portion SLM serves as a seal for enclosing the liquid crystal between the substrate 10 and the substrate 20. Further, the sealing portion SLM serves as an adhesive material for adhering the substrate 10 and the substrate 20.

The side light source device 30 has a light source unit 31. The light source unit 31 is arranged at a position facing a side surface 20s1 of the substrate 20. As schematically shown by an alternate long and two short dashes line in FIG. 2, the light source light L1 emitted from the light source unit 31 propagates in a direction away from the side surface 20s1 while being reflected by the back surface 10b of the substrate 10 and the front surface 20f of the substrate 20. In the propagation path of the light source light L1, the back surface 10b of the substrate 10 and the front surface 20f of the substrate 20 are interfaces between a medium having a large refractive index and a medium having a small refractive index. Therefore, when the incident angle at which the light source light L1 is incident on the front surface 20f and the back surface 10*b* is larger than the critical angle, the light source light L1 is totally reflected on the front surface 20*f* and the back surface 10*b*.

The liquid crystal LQ is a polymer-dispersed liquid crystal LC and contains a liquid crystal polymer and liquid crystal molecules. The liquid crystal polymer is formed in a streak pattern, and the liquid crystal molecules are dispersed in the gaps of the liquid crystal polymer. Each of the liquid crystal polymer and the liquid crystal molecules has optical anisotropy or refractive index anisotropy. The responsiveness of the liquid crystal polymer to the electric field is lower than the responsiveness of the liquid crystal molecule to the electric field. The orientation direction of the liquid crystal polymer hardly changes regardless of the present or absence of an electric field. On the other hand, the orientation direction of the liquid crystal molecules changes in accordance with the electric field in the state where a voltage higher than the threshold value is applied to the liquid crystal LQ. When no voltage is applied to the liquid crystal LQ, the optical axes of the liquid crystal polymer and the liquid crystal molecules are parallel to each other, and the light source light L1 incident on the liquid crystal layer LQ is hardly scattered in the liquid crystal layer LQL and is transmitted (transparent state). In the state where a voltage is applied to the liquid crystal LQ, the optical axes of the liquid crystal polymer and the liquid crystal molecules intersect each other, and the light source light L1 incident on the liquid crystal LQ is scattered in the liquid crystal layer LQL (scattering state). The display device DSP1 controls the transparent state and the scattering state by controlling the orientation of the liquid crystal LQ in the propagation path of the light source light L1. In the scattering state, the light source light L1 is emitted as the emitted light L2 by the liquid crystal LQ from the front surface 20*f* to the outside of the display device DSP1. Further, the background light L3 incident from the back surface 10*b* passes through the substrate 10, the liquid crystal layer LQL, and the substrate 20, and is emitted to the outside from the front surface 20*f*. The emitted light L2 and the background light L3 are visually recognized by the viewer located on the side of the front surface 20*f*. The viewer can recognize the emitted light L2 and the background light L3 in combination. The display device with which the viewer can recognize the displayed image and the background in superimposition as described above is referred to as a transparent display device.

<Transparent Display Device>

Figure 3:
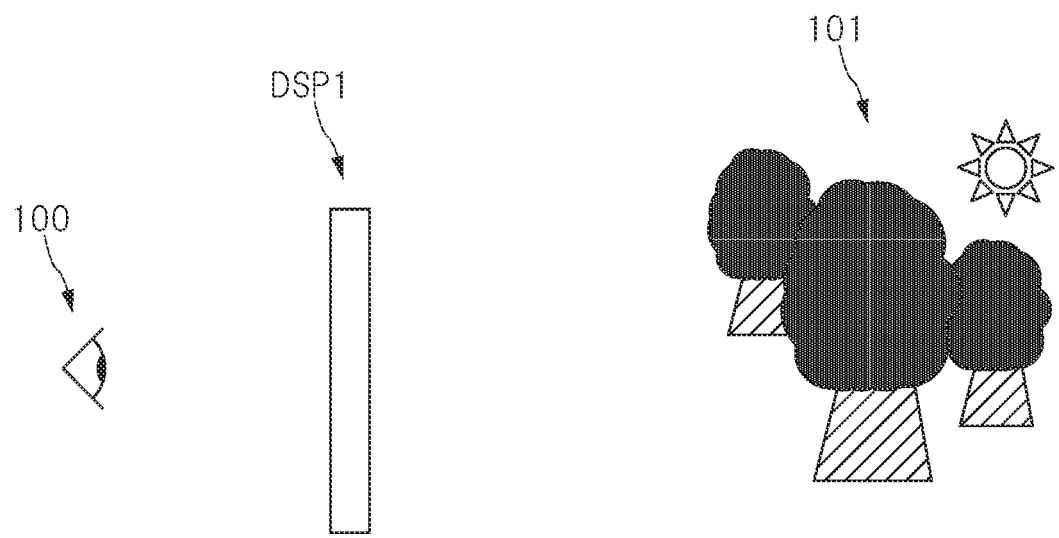
FIG. 3 is an explanatory diagram showing the positional relationship when a viewer located on one side of a transparent display device visually recognizes a background on the other side through the transparent display device.
Figure 4:
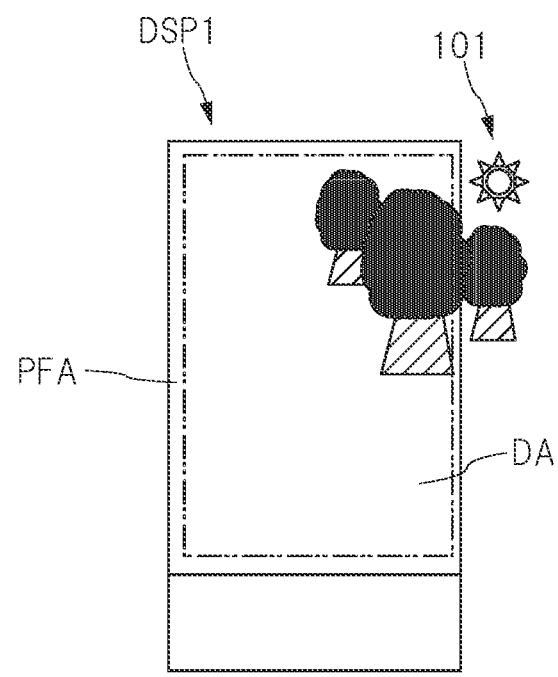
FIG. 4 is an explanatory diagram showing an example of the background visually recognized through the transparent display device.

Next, features of the transparent display device will be described. FIG. 3 is an explanatory diagram showing the positional relationship when a viewer located on one side of a transparent display device visually recognizes a background on the other side through the transparent display device. FIG. 4 is an explanatory diagram showing an example of the background visually recognized through the transparent display device.

As shown in FIG. 3, when a viewer 100 sees from one side of the display device DSP1 to the other side, a background 101 is visually recognized through the display device DSP1. As shown in FIG. 4, when both the display region DA and the peripheral region PFA outside the display region DA transmit light, the entire background 101 can be visually recognized without discomfort. On the other hand, when the peripheral region PFA has a light blocking property for preventing the light transmission, a part of the background 101 visually recognized through the display device DSP1 is blocked by the peripheral region PFA, so that it may give a sense of discomfort to the observer 100 (see FIG. 3). As described above, in the case of the transparent display device, it is preferable that each of the display region DA and the peripheral region PFA has transmission characteristics for visible light. Also, from the viewpoint of visually recognizing the background 101 without discomfort, it is particularly preferable that the display region DA and the peripheral region PFA have almost the same transmission characteristics for visible light.

<Configuration Example of Circuit>

Figure 5:
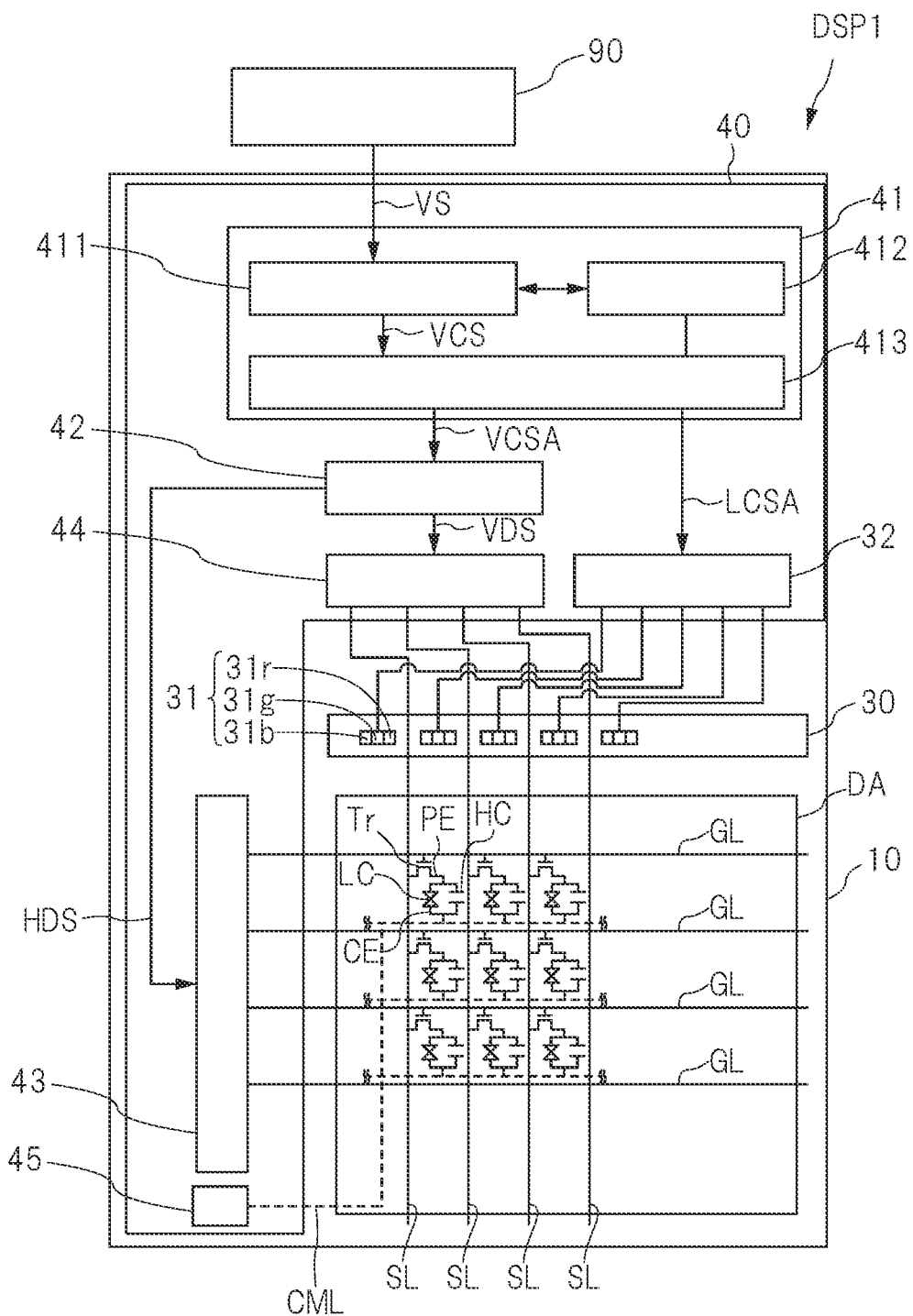
FIG. 5 is a circuit block diagram showing an example of a circuit provided in the display device in FIG. 1.

Next, a configuration example of the circuit provided in the display device shown in FIG. 1 will be described. FIG. 5 is a circuit block diagram showing an example of the circuit provided in the display device in FIG. 1. For example, the wiring path connected to a common electrode CE shown in FIG. 5 is formed on the substrate 20 shown in FIG. 2. In FIG. 5, the wiring formed on the substrate 20 is shown by a dotted line. In the example shown in FIG. 5, a light source control unit 32 is included in the drive circuit 40. As a modification, the light source control unit 32 may be provided separately from the drive circuit 40. For example, the light source control unit 32 is formed on a wiring board (not shown) connected to the side light source device 30 shown in FIG. 1 and is electrically connected to the light source unit 31 via the wiring board.

In the example shown in FIG. 5, the drive circuit 40 includes a signal processing circuit 41, a pixel processing circuit 42, a gate drive circuit 43, a source drive circuit 44, and a common potential drive circuit 45. Further, the light source unit 31 includes, for example, a red light source unit 31*r*, a green light source unit 31*g*, and a blue light source unit 31*b*. As shown in FIG. 1, since the substrate 10 has a larger area than that of the substrate 20, each of the drive circuit 40 and the side light source device 30 is provided on the substrate 10.

The signal processing circuit 41 includes an input signal analysis unit (input signal analysis circuit) 411, a storage unit (storage circuit) 412, and a signal adjustment unit 413. The display device DSP1 includes a control unit 90 having a control circuit for controlling the image display, and the input signal VS is input to the input signal analysis unit 411 of the signal processing circuit 41 from the control unit 90 via a wiring path of a flexible wiring board or the like (not shown). The input signal analysis unit 411 performs analysis processing based on the input signal VS input from the outside, and generates the input signal VCS. The input signal VCS is, for example, a signal that determines what kind of gradation value is given to each pixel PIX (see FIG. 1) of the display panel P1 (see FIG. 1) based on the input signal VS.

The signal adjustment unit 413 generates the input signal VCSA from the input signal VCS input from the input signal analysis unit 411. The signal adjustment unit 413 sends the input signal VCSA to the pixel control circuit 42, and sends the light source control signal LCSA to the light source control unit 32. The light source control signal LCSA is, for example, a signal including the information of the amount of light of the light source unit 31 set in accordance with the input gradation value to the pixel PIX. For example, when a dark image is displayed, the amount of light of the light source unit 31 is set small. When a bright image is displayed, the amount of light of the light source unit 31 is set large.

The pixel control circuit 42 generates the horizontal drive signal HDS and the vertical drive signal VDS based on the input signal VCSA. For example, since the field sequential method is adopted for driving in the present embodiment, the horizontal drive signal HDS and the vertical drive signal VDS are generated for each color of light that the light source unit 31 can emit. The gate drive circuit 43 sequentially selects the gate line GL of the display panel P1 (see FIG. 1) within one vertical scanning period based on the horizontal drive signal HDS. The order of selection of the gate line GL is arbitrary. As shown in FIG. 1, a plurality of gate lines (signal wiring) GL extend in the X direction and are arranged along the Y direction.

The source drive circuit 44 supplies the gradation signal in accordance with the output gradation value of each pixel PIX (see FIG. 1) to each source line SL of the display panel P1 (see FIG. 1) within one horizontal scanning period based on the vertical drive signal VDS. As shown in FIG. 1, the plurality of source lines (signal wiring) SL extend in the Y direction and are arranged along the X direction. One pixel PIX is formed at each intersection of the gate line GL and the source line SL. A switching element Tr (see FIG. 5) is formed at each portion where the gate line GL and the source line SL intersect. The plurality of gate lines GL and the plurality of source lines SL shown in FIG. 1 and FIG. 5 correspond to a plurality of signal wirings for transmitting the drive signal for driving the liquid crystal LQ shown in FIG. 2.

For example, a thin film transistor is used as the switching element Tr shown in FIG. 5. The type of the thin film transistor is not particularly limited, and examples thereof include the following transistors. When classified by the position of the gate, a bottom gate transistor and a top gate transistor can be presented. Further, when classified by the number of gates, a single gate thin film transistor and a double gate thin film transistor can be presented. One of the source electrode and the drain electrode of the switching element Tr is connected to the source line SL, the gate electrode is connected to the gate line GL, and the other of the source electrode and the drain electrode is connected to one end of the capacitor of the polymer-dispersed liquid crystal LC (liquid crystal LQ shown in FIG. 2). One end of the capacitor of the polymer-dispersed liquid crystal LC is connected to the switching element Tr via the pixel electrode PE, and the other end is connected to the common potential wiring CML via the common electrode CE. Further, a holding capacitor HC is generated between the pixel electrode PE and the holding capacitor electrode electrically connected to the common potential wiring CML. The common potential wiring CML is supplied from the common potential drive circuit 45.

<Structure Around Liquid Crystal Supply Portion>

Figure 6:
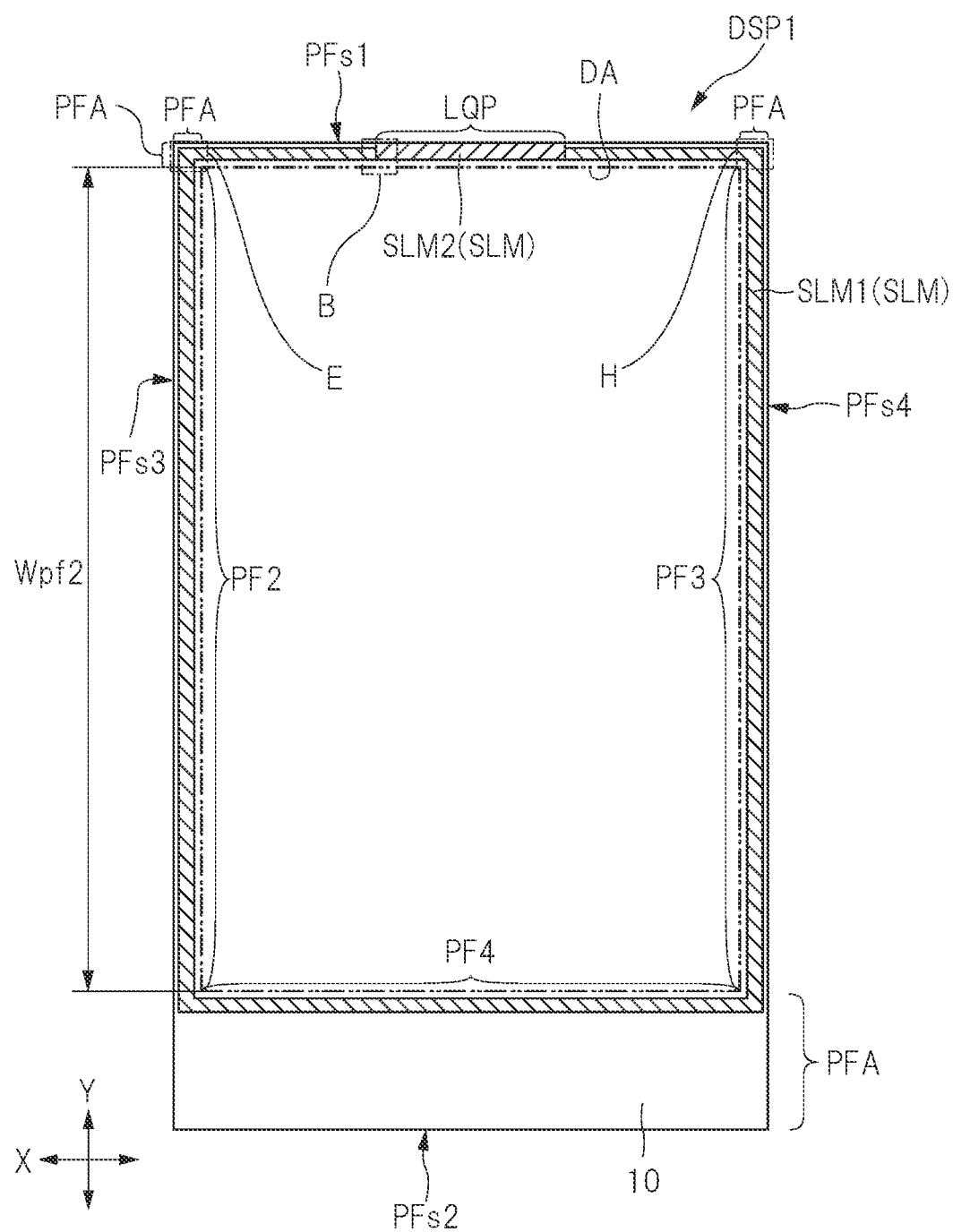
FIG. 6 is a plan view showing a planar positional relationship between the sealing portion SLM shown in FIG. 2 and the display region shown in FIG. 1.
Figure 7:
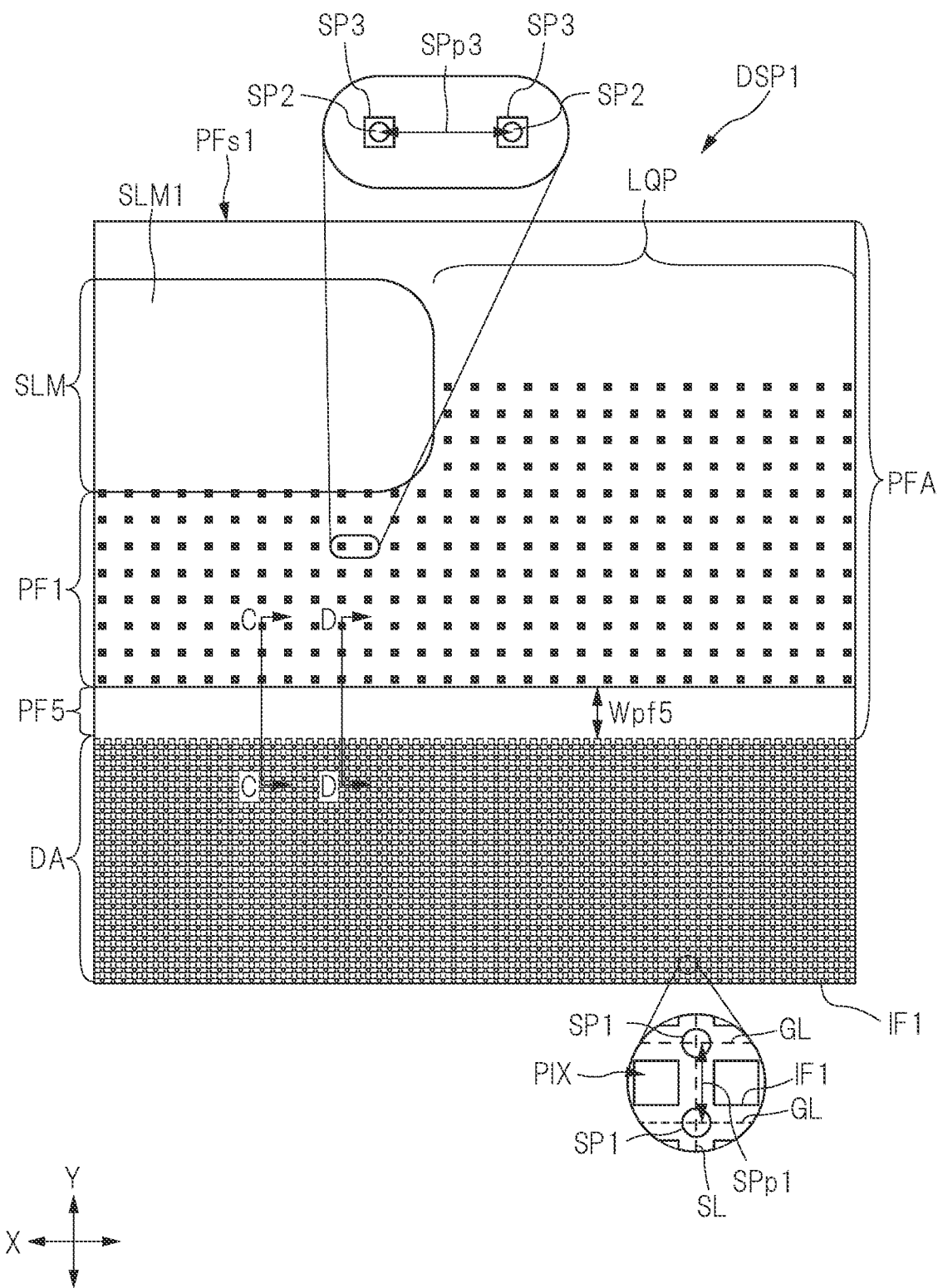
FIG. 7 is an enlarged plan view of a portion B in FIG. 6.
Figure 8:
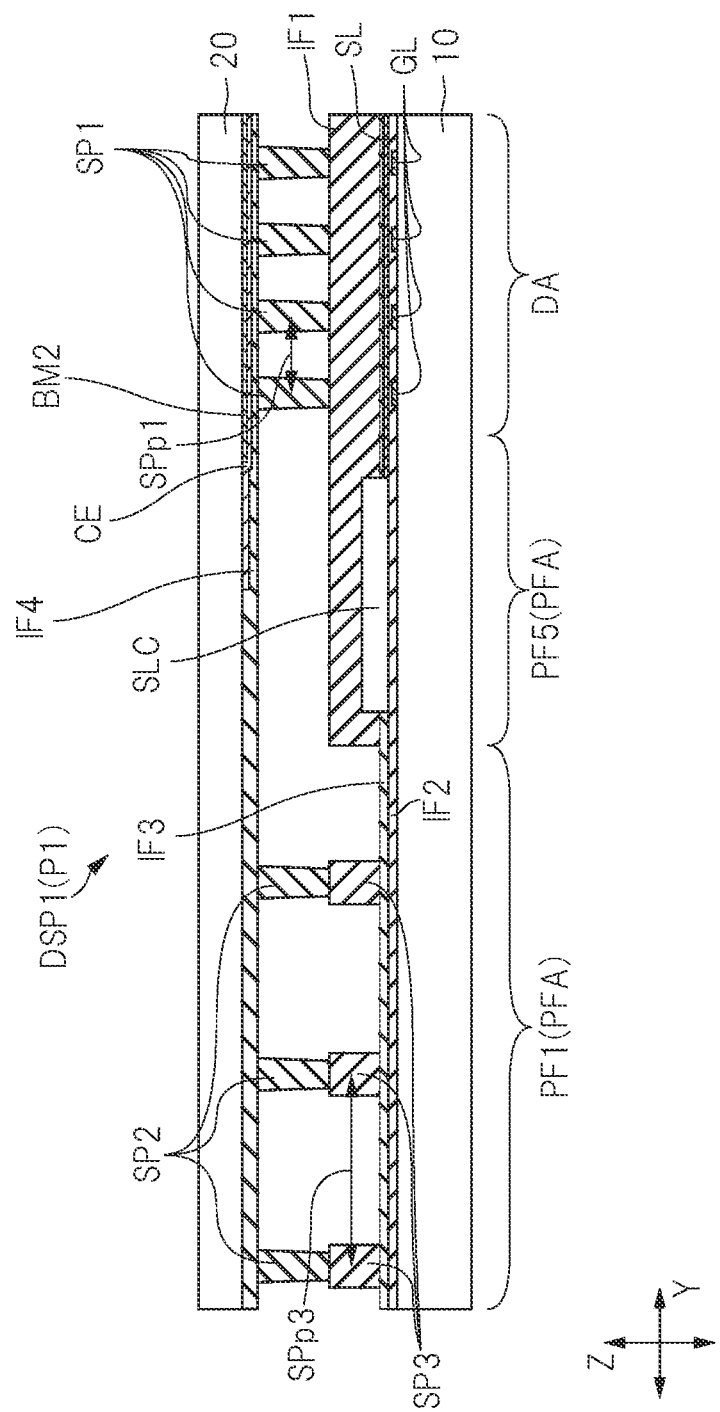
FIG. 8 is an enlarged cross-sectional view taken along the line C-C in FIG. 7.
Figure 9:
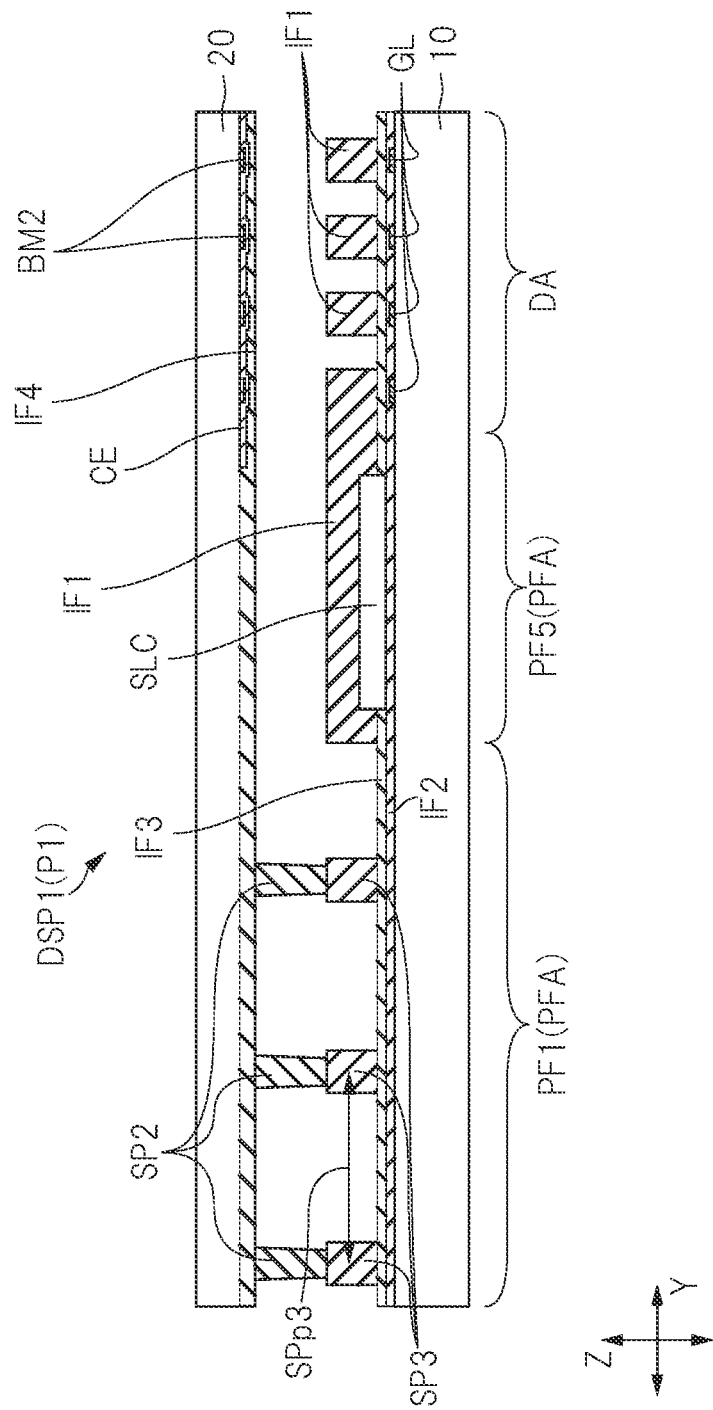
FIG. 9 is an enlarged cross-sectional view taken along the line D-D in FIG. 7.

Next, a structure and an enclosing method for enclosing the liquid crystal layer LQL inside the sealing portion SLM shown in FIG. 2 will be described. FIG. 6 is a plan view showing a planar positional relationship between the sealing portion SLM shown in FIG. 2 and the display region shown in FIG. 1. FIG. 7 is an enlarged plan view of a portion B in FIG. 6. FIG. 8 is an enlarged cross-sectional view taken along the line C-C in FIG. 7. FIG. 9 is an enlarged cross-sectional view taken along the line D-D in FIG. 7. FIG. 6 and FIG. 7 are plan views of the display device shown in FIG. 1 as viewed from the side of the substrate 20, and the illustration of the substrate 20 is omitted. Although FIG. 6 is a plan view, hatching is applied to the sealing material SLM1 and the sealing material SLM2 in order to clarify the shapes of the sealing material SLM1 and the sealing material SLM2. In FIG. 6, a liquid crystal supply portion LQP of the display device DSP1 is sealed with the sealing material SLM2, but the sealing material SLM2 shown in FIG. 6 is removed in FIG. 7. In the manufacturing process before enclosing the liquid crystal LQ (see FIG. 2), the sealing material SLM2 is not yet formed as shown in FIG. 7, and the liquid crystal supply portion LQP serves as an opening that interconnects the space surrounded by the sealing portion SLM and the outside.

As shown in FIG. 6, the peripheral region PFA has a side PFs1, a side PFs2 on the opposite side of the side PFs1, a side PFs3 intersecting with the side PFs1, and a side PFs4 on the opposite side of the side PFs3. The sealing portion SLM is provided in the peripheral region PFA between the substrate 10 and the substrate 20 (see FIG. 2). The following peripheral regions PF1 (see FIG. 7) to PF4 are provided along each side of the peripheral region PFA between the sealing portion SLM and the display region DA. The peripheral region PF1 includes a region between the display region DA and the sealing portion SLM and is arranged so as to extend along the side PFs1. The peripheral region PF4 includes a region between the display region DA and the sealing portion SLM and is arranged so as to extend along the side PFs2. The peripheral region PF2 includes a region between the display region DA and the sealing portion SLM and is arranged so as to extend along the side PFs3. The peripheral region PF3 includes a region between the display region DA and the seal portion SLM and is arranged so as to extend along the side PFs4.

The liquid crystal supply portion LQP is formed in at least one of the sides PFs1, PFs2, PFs3, and PFs4 of the peripheral region PFA. The liquid crystal supply portion LQP is an opening provided at a part of the sealing portion SLM and formed so as to interconnect the outside of the sealing portion SLM and the display region DA. However, as described above, in the display device DSP1 of the finished product, the liquid crystal supply portion LQP is sealed with the sealing material SLM2. In the example shown in FIG. 6, the liquid crystal supply portion LQP is formed on the side PFs1 of the peripheral region PFA. In the manufacturing process of the display device DSP1, for example, the step of supplying the liquid crystal LQ shown in FIG. 2 to the inside of the sealing material SLM2 is performed as follows.

First, the substrate 10 and the substrate 20 shown in FIG. 1 are adhered and fixed via the sealing material SLM1 of the sealing portion SLM shown in FIG. 6. At this time, the sealing material SLM2 is not arranged at the liquid crystal supply portion LQP, and an opening is formed there. Next, the liquid crystal LQ (see FIG. 2) is brought into contact with the liquid crystal supply portion LQP in the state where the structure obtained by adhering the substrate 10 and the substrate 20 is arranged in a vacuum atmosphere (reduced pressure atmosphere lower than the atmospheric pressure). Then, when the environmental pressure is returned to atmospheric pressure in the state where the liquid crystal LQ is in contact with the liquid crystal supply portion LQP, the liquid crystal LQ is injected into the space surrounded by the sealing portion SLM by the pressure difference between the space surrounded by the sealing portion SLM and the outside and the capillary phenomenon. Thereafter, by sealing the opening of the liquid crystal supply portion LQP with the sealing material SLM2 shown in FIG. 6, the display panel P1 in which the liquid crystal LQ is enclosed between the substrate 10 and the substrate 20 is obtained as shown in FIG. 2.

The study by the inventors of the present application revealed that the above-mentioned method of enclosing the liquid crystal LQ had the problem that affected the performance of the display device. For example, when the liquid crystal LQ (see FIG. 2) is supplied from the liquid crystal supply portion LQP shown in FIG. 6, if there is a member that obstructs the flow of the liquid crystal in the space surrounded by the sealing portion SLM, a large number of fine bubbles may be generated in the liquid crystal layer LQL (see FIG. 2). If these fine bubbles remain, they affect the display performance of the display device.

As shown in FIG. 8, the display device DSP1 includes an insulating film IF1 covering the source line SL (and the gate line GL shown in FIG. 7) between the substrate 10 and the substrate 20. The insulating film IF1 is, for example, an organic insulating film made of an organic insulating material such as an acrylic resin. The insulating film IF1 which is an organic insulating film can be formed to have a large thickness as compared with other insulating films made of an inorganic material (for example, an insulating film IF2 formed on the gate line GL and an insulating film IF3 formed on the source line SL shown in FIG. 8). In the display region DA shown in FIG. 7, the gate line GL and the source line SL are covered with the thick insulating film IF1. Consequently, it is possible to protect the gate line GL and the source line SL. Further, when the holding capacitor electrode electrically connected to the common potential wiring CML (see FIG. 5) is formed on the insulating film IF1, the influence of the common potential on the gate line GL and the source line SL can be reduced by arranging the thick insulating film IF1 between the holding capacitor electrode and the gate line GL and the source line SL.

In the case of the present embodiment, as shown in FIG. 7, the insulating film IF1 is formed in a grid pattern along the extending directions of the gate line GL and the source line SL. In this case, since the exposed area of the pixel PIX from the insulating film IF1 can be increased, the light transmission characteristics of the display device can be improved. As a modification, the pixel PIX may be covered with the insulating film IF1.

Further, as shown in FIG. 7 and FIG. 8, the display device DSP1 includes a plurality of spacer members SP1 arranged between the insulating film IF1 and the substrate 20 in the display region DA so as to maintain a gap between the substrate 10 and the substrate 20. Since the spacer member SP1 is arranged at a position overlapping with the insulating film IF1, the gap between the substrate 10 and the substrate 20 can be maintained with high accuracy.

It is necessary to maintain the gap between the substrate 10 and the substrate 20 also in the peripheral region PFA shown in FIG. 7 and FIG. 8. Since the transparent display device of the present embodiment needs to transmit light also in the peripheral region PFA, a structure in which the insulating film IF1 is arranged also in the peripheral region PFA as in the display region DA is conceivable from the viewpoint of making the display region DA and the peripheral region PFA have similar light transmission characteristics. However, the study by the inventors of the present application revealed that, when the insulating film IF1 was arranged in the peripheral region PFA, in particular, in the vicinity of the liquid crystal supply portion LQP, the insulating film IF1 became an obstacle that obstructed the flow of the liquid crystal LQ (see FIG. 2) and the above-mentioned fine bubbles were generated.

Therefore, in the present embodiment, the structure shown in FIG. 7 and FIG. 8 was found as a structure capable of suppressing the generation of bubbles and maintaining the gap between the substrate 10 and the substrate 20 in the peripheral region PFA. Namely, the peripheral region PFA includes a peripheral region PF1 located between the display region DA and the sealing portion SLM (see FIG. 7), and the insulating film IF1 is removed in the peripheral region PF1. In the peripheral region PF1, a plurality of spacer members SP2 made of the same material as that of the plurality of spacer members SP1 and a plurality of spacer members SP3 formed between the plurality of spacer members SP2 and the substrate 10 and supporting the plurality of spacer members SP2 are provided. The plurality of spacer members SP3 are separated from each other.

The peripheral region PF1 spreads not only between the liquid crystal supply portion LQP and the display region DA but also between the sealing material SLM1 and the display region DA in the X direction along the side PFs1 (see FIG. 6). More specifically, the peripheral region PF1 from which the insulating film IF1 is removed continuously spreads in the X direction from the boundary with the sealing portion SLM along the side PFs3 shown in FIG. 6 to the boundary with the sealing portion SLM along the side PFs3.

In the case of the display device DSP1, the wider cross-sectional area of the injection path of liquid crystal can be secured as compared with the case in which the insulating film IF1 is arranged in the peripheral region PF1 as in the display region DA, so that the flow of the liquid crystal is less likely to be obstructed. As a result, the generation of the above-mentioned bubbles can be suppressed. Also, as shown in FIG. 8, even when the insulating film IF1 is not formed in the peripheral region PF1, since the spacer members SP2 and the spacer members SP3 are arranged so as to overlap between the substrate 10 and the substrate 20, the gap between the substrate 10 and the substrate 20 can be maintained.

In the case of the present embodiment, the plurality of spacer members SP1 and the plurality of spacer members SP2 are formed on the side closer to the substrate 20, and the plurality of spacer members SP3 are formed on the side closer to the substrate 10. The plurality of spacer members SP2 and the plurality of spacer members SP3 are formed at positions where they face each other when the substrate 10 and the substrate 20 are overlapped with each other. In this case, since it is not necessary to make the thickness (height in the Z direction) of the plurality of spacer members SP2 and the plurality of spacer members SP3 extremely large, each of the plurality of spacer members SP2 and the plurality of spacer members SP3 can be easily formed.

Each of the spacer members SP1, SP2, and SP3 may be made of different materials and formed to have different thicknesses. However, from the viewpoint of improving the work efficiency of the process of forming the spacer members SP2 and SP3, the following is preferable. That is, it is preferable that the plurality of spacer members SP2 are made of the same material as that of the plurality of spacer members SP1 and have the same thickness (height in the Z direction) as that of the plurality of spacer members SP1. As a result, the spacer members SP1 and SP2 can be formed at one time in the step of forming the spacer member SP1, so that it is possible to prevent the addition of a manufacturing process for forming the spacer member SP2.

Figure 12:
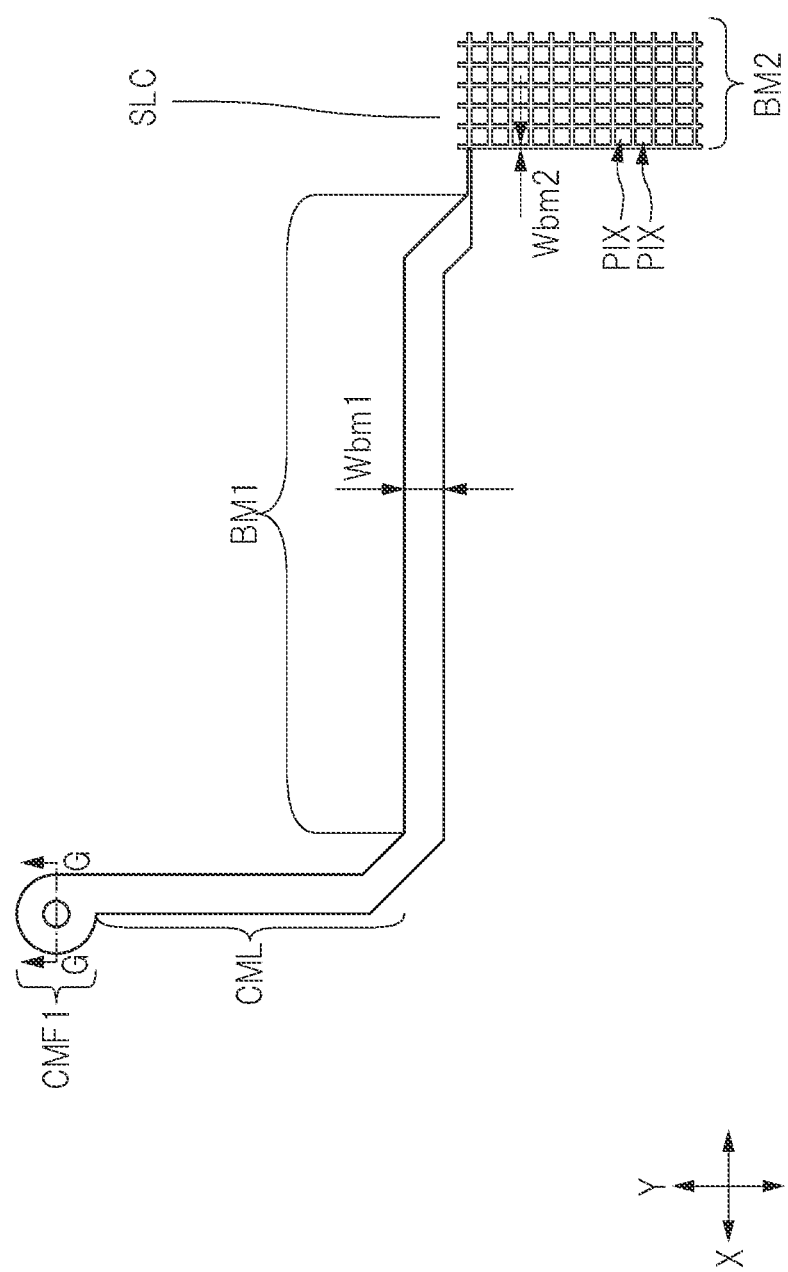
FIG. 12 is a plan view for describing the light blocking film in the display region and the light blocking film in the peripheral region shown in FIG. 10.

As shown in FIG. 8 and FIG. 9, a common electrode CE, a light blocking film BM2 provided in a grid pattern at a position overlapping with the source line SL (see FIG. 8) and the gate line GL in the display region DA, and an insulating film IF4 which is an overcoat film covering the common electrode CE and the light blocking film BM2 are formed in the display region DA of the substrate 20. As shown in FIG. 12 which will be described later, the light blocking film BM2 is formed in a grid pattern at a position overlapping with the insulating film IF1 formed in a grid pattern shown in FIG. 7. Although not shown, an alignment film may be formed between the insulating film IF4 and the spacer members SP1 and SP2. As shown in FIG. 8, each of the plurality of spacer members SP1 and the plurality of spacer members SP2 is formed on the insulating film IF4 (or on an alignment film (not shown)). As in the example shown in FIG. 8, the common electrode CE and the light blocking film BM2 may not be formed in the peripheral region PF1. However, since the insulating film IF4 also has a function as a flattening film, the height at which the spacer member SP1 is formed and the height at which the spacer member SP2 is formed are substantially the same.

Further, it is preferable that each of the plurality of spacer members SP3 has the same thickness as that of the insulating film IF1 in the display region DA and is made of the same material as that of the insulating film IF1. When the insulating film IF1 and the spacer member SP3 are made of the same material, for example, the insulating film IF1 and the plurality of spacer members SP3 having the shapes shown in FIG. 7 can be formed at one time by forming the insulating film IF1 as a flattening film that continuously spreads from the display region DA to the peripheral region PFA, and then selectively removing a part of the insulating film IF1 by etching process.

By making the spacer member SP2 and the spacer member SP1 have the same thickness and making the spacer member SP3 and the insulating film IF1 have the same thickness, the gap between the substrate 10 and the substrate 20 in the display region DA can be made the same as the gap between the substrate 10 and the substrate 20 in peripheral region PF1. By maintaining the gap between the substrate 10 and the substrate 20 in the peripheral region PF1 in this way, it is possible to prevent the flow path from becoming narrow when injecting the liquid crystal LQ (see FIG. 2).

Figure 10:
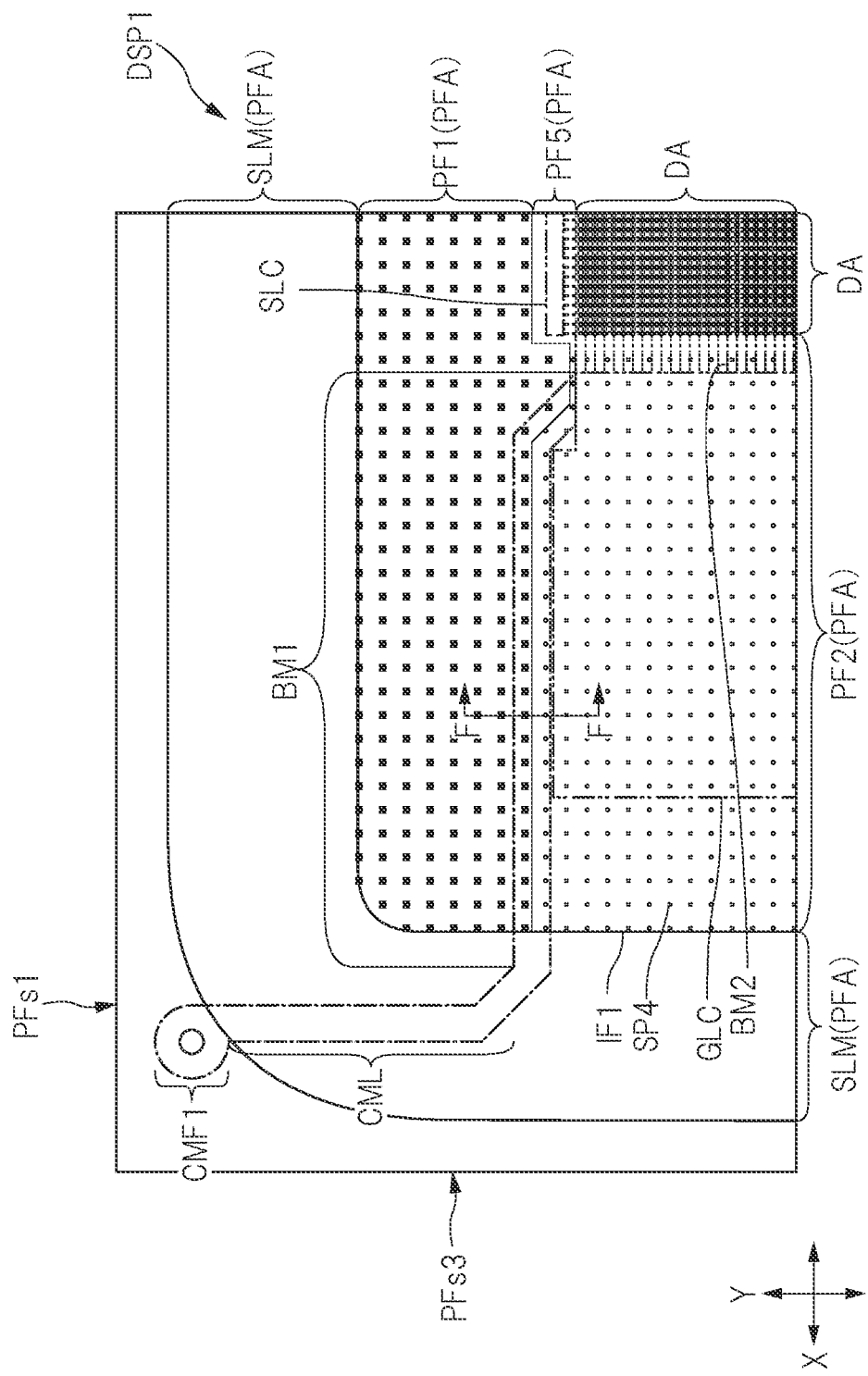
FIG. 10 is an enlarged plan view of a portion E in FIG. 6.

By the way, in the example shown in FIG. 7 to FIG. 9, the display device DSP1 includes a peripheral region PF5 in which a circuit SLC connected to the plurality of source lines (signal wiring) SL is arranged and the insulating film IF1 covering the circuit SLC is formed. The circuit SLC is, for example, a pixel electrode selection circuit, a test circuit, a protection circuit, or the like. When the circuit SLC connected to the plurality of source lines SL is arranged in the peripheral region PFA as described above, it is preferable that the insulating film IF1 covering the circuit SLC is provided from the viewpoint of protecting the circuit SLC. Although FIG. 8 and FIG. 9 show the circuit SLC connected to the source line SL as an example, the gate drive circuit 43 connected to the gate line GL shown in FIG. 5 or a circuit GLC (see FIG. 10 described later) composed of a test circuit and a protection circuit is arranged on either or both of the side PFs3 and the side PFs4 shown in FIG. 6. Although details will be described later, the circuit GLC shown in FIG. 10 is covered with the insulating film IF1 (see FIG. 8) as in the structure shown in FIG. 8 and FIG. 9.

Further, since the insulating film IF1 is formed in the peripheral region PF5, the flow path of the liquid crystal is narrowed in the peripheral region PF5. Therefore, from the viewpoint of widening the flow path of the liquid crystal as much as possible, it is preferable that the plurality of spacer members SP1 and the plurality of spacer members SP2 are not formed in the peripheral region PF5 as in the example shown in FIG. 7 to FIG. 9. It is preferable that the width of the insulating film IF1 in the Y direction is narrowed as much as possible within a range in which the circuit SLC is not exposed. Therefore, even if the plurality of spacer members SP1 and the plurality of spacer members SP2 are not formed in the peripheral region PF5, the gap between the substrate 10 and the substrate 20 can be maintained if the plurality of spacer members SP2 and SP3 are formed in the peripheral region PF1. However, as a modification, the spacer members SP2 may be formed also in the peripheral region PF5 as in the peripheral region PF1.

Further, the following structure is preferable from the viewpoint of widening the flow path of the liquid crystal in the peripheral region PF1. As shown in FIG. 7 and FIG. 8, the array pitch SPp3 of the spacer members SP3 adjacent to each other among the plurality of spacer members SP3 is wider than the array pitch SPp1 of the spacer members SP1 adjacent to each other among the plurality of spacer members SP1. The array pitch SPp3 is defined as the distance between the centers of the spacer members SP3 adjacent to each other in a plan view, and the array pitch SPp1 is defined as the distance between the centers of the spacer members SP1 adjacent to each other in a plan view. Each of the spacer members SP1, SP2, and SP3 is regularly arranged. Therefore, the array pitch SPp1 shown in FIG. 7 and the array pitch SPp1 shown in FIG. 8 have the same value. Similarly, the array pitch SPp3 shown in FIG. 7 and the array pitch SPp3 shown in FIG. 8 have the same value.

In the case of the example shown in FIG. 7 and FIG. 8, the array pitch SPp1 is 0.2 mm, and the array pitch SPp3 is 0.5 mm. However, the values of the array pitch SPp1 and the array pitch SPp3 can be changed in accordance with the specifications of the display device, and are not limited to the above-mentioned values. In particular, as shown in FIG. 7, since the spacer members SP1 are arranged at the positions where the insulating film IF1 formed in a grid pattern intersects, the value of the array pitch SPp1 is changed in accordance with the size of the pixel PIX.

<Structure of Corner Portion of Peripheral Region>

Figure 11:
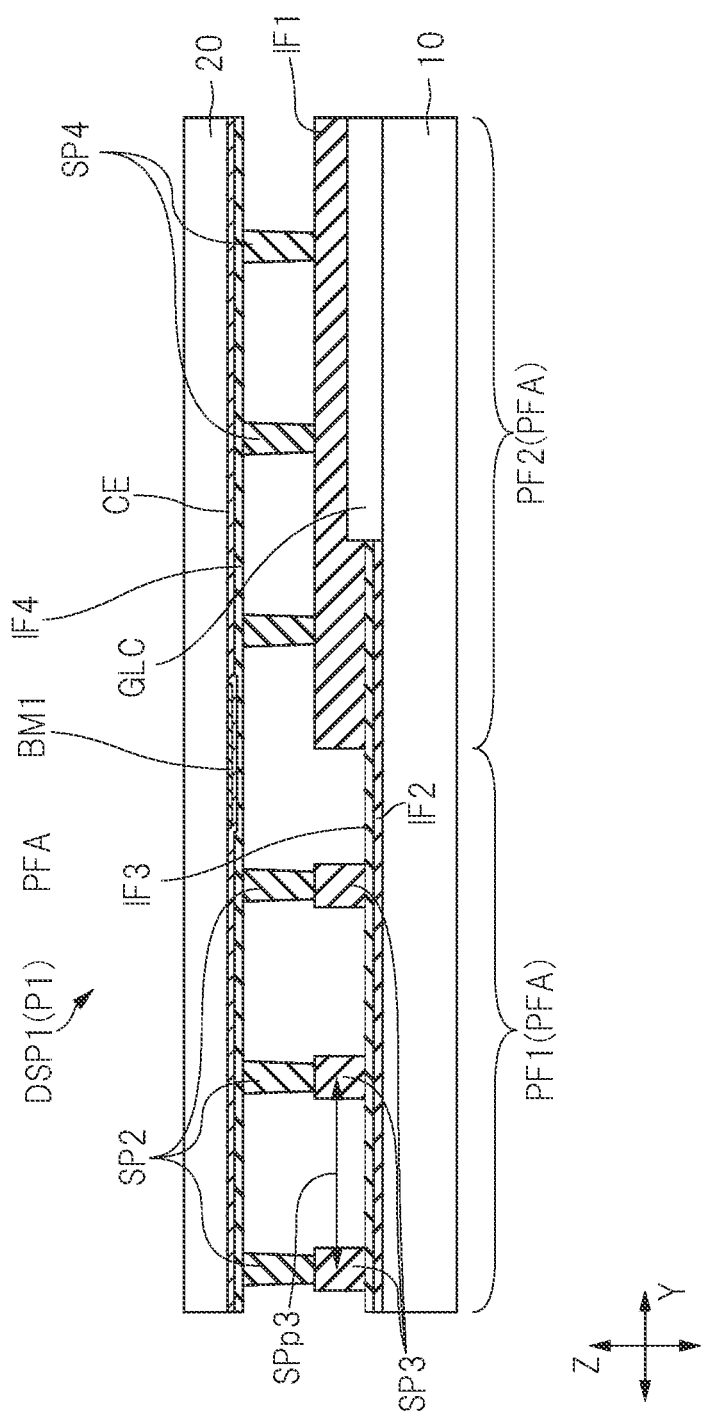
FIG. 11 is an enlarged cross-sectional view taken along the line F-F in FIG. 10.

Next, the structure of the corner portion of the peripheral region of the display device DSP1 shown in FIG. 6 will be described. FIG. 10 is an enlarged plan view of the portion E in FIG. 6. In FIG. 10, a light blocking film BM1 formed on the substrate 20 (see FIG. 2), a feeding portion CMF1 for supplying a common potential to the light blocking film BM1, and a light blocking film BM2 arranged in a grid pattern in the display region DA are shown by an alternate long and short dash line. Further, in FIG. 10, the circuit SLC and the circuit GLC are shown by an alternate long and two short dashes line. FIG. 11 is an enlarged cross-sectional view taken along the line F-F in FIG. 10.

As shown in FIG. 10, the peripheral region PFA of the display device DSP1 includes the peripheral region PF1 extending along the side PFs1 and the peripheral region PF2 extending along the side PFs3. The peripheral region PF1 is a region which includes a portion between the display region DA and the sealing portion SLM and a portion between the peripheral region PF2 and the sealing portion SLM and from which the insulating film IF1 is removed. The peripheral region PF2 is a region arranged between the display region DA and the sealing portion SLM. In the peripheral region PF2, the circuit GLC connected to a plurality of gate lines (signal wiring) GL (see FIG. 1) is arranged, and the insulating film IF1 covering the circuit GLC is formed. The circuit GLC is, for example, the gate drive circuit 43 (see FIG. 5), a test circuit, a protection circuit, a pixel electrode selection circuit, or the like. When the circuit GLC connected to the plurality of gate lines GL is arranged in the peripheral region PFA as described above, it is preferable that the insulating film IF1 covering the circuit GLC is provided from the viewpoint of protecting the circuit GLC. As shown in FIG. 10 and FIG. 11, in the peripheral region PF2, a plurality of spacer members SP4 are arranged between the insulating film IF1 and the substrate 20. The plurality of spacer members SP4 are made of the same material as the spacer member SP2, and are arranged at the same arrangement pitch as the plurality of spacer members SP2.

The display device DSP1 of the present embodiment is a transparent display device. Therefore, as described with reference to FIG. 3 and FIG. 4, from the viewpoint of visually recognizing the background 101 without discomfort, it is particularly preferable that each of the display region DA and the peripheral region PFA has almost the same transmission characteristics for visible light. As described above, in the peripheral region PF1, the insulating film IF1 is removed from the viewpoint of widening the cross-sectional area of the supply path of the liquid crystal. On the other hand, in the peripheral region PF2, the insulating film IF1 is formed in order to protect the circuit GLC. The study by the inventors of the present application revealed that, when the region covered with the insulating film IF1 and the region from which the insulating film IF was removed were present, the boundary therebetween became conspicuous enough to be visually recognizable. It is conceivable that this is because the difference in light transmittance becomes large depending on the presence or absence of the insulating film IF1.

As shown in FIG. 7, the peripheral region PF5 is covered with the insulating film IF1 and is adjacent to the peripheral region PF1 from which the insulating film IF1 is removed. However, the boundary between the peripheral region PF1 and the peripheral region PF5 is not as conspicuous as the boundary between the peripheral region PF1 and the peripheral region PF2 shown in FIG. 10. It is conceivable that this is because the width Wpf5 of the peripheral region PF5 in the Y direction is sufficiently narrower than the width Wpf2 of the peripheral region PF2 in the Y direction (see FIG. 6). From the above, by making the boundary between the peripheral region PF1 and the peripheral region PF2 shown in FIG. 10 less conspicuous, the background recognition performance of the display device DSP1 which is a transparent display device can be improved.

As shown in FIG. 11, the light blocking film BM1 is formed on the substrate 20 of the display device DSP1. The light blocking film BM1 is arranged so as to straddle the peripheral region PF1 and the peripheral region PF2. Further, as shown in FIG. 10, the light blocking film BM1 extends linearly along the extending direction (X direction in FIG. 10) of the boundary between the peripheral region PF1 and the peripheral region PF2. In other words, in the perspective plan view seen from the side of the substrate 20 (that is, plan view corresponding to FIG. 10), the boundary between the peripheral region PF1 and the peripheral region PF2 overlaps with the light blocking film BM1.

By arranging the light blocking film BM1 along the boundary between the peripheral region PF1 and the peripheral region PF2, the light around the boundary is blocked by the light blocking film BM1. As a result, the boundary between the peripheral region PF1 and the peripheral region PF2 can be made less conspicuous. For example, the light blocking films BM1 and BM2 are metal films made of one or more kinds of metals selected from aluminum (Al), copper (Cu), silver (Ag), molybdenum (Mo), chromium (Cr), titanium (Ti), and tungsten (W).

Figure 13:
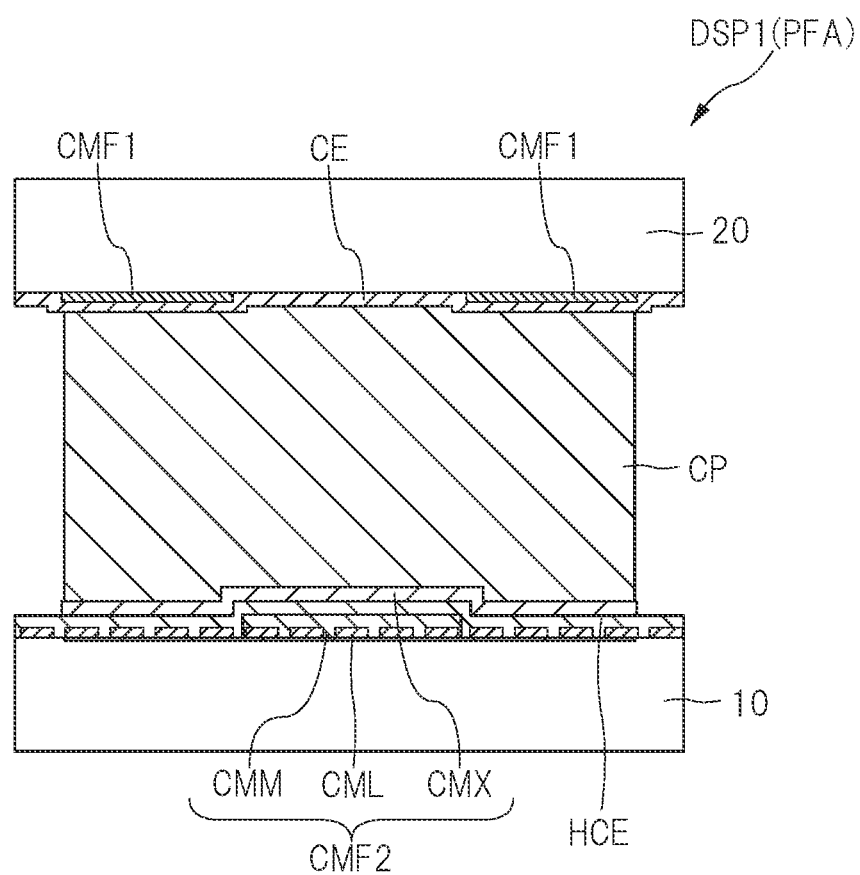
FIG. 13 is a cross-sectional view taken along the line G-G in FIG. 12.

FIG. 12 is a plan view for describing the light blocking film in the display region and the light blocking film in the peripheral region shown in FIG. 10. FIG. 13 is a cross-sectional view taken along the line G-G in FIG. 12. In the display region DA, the light blocking film BM2 is provided in a region overlapping with the source line SL, the gate line GL, and the switching element Tr shown in FIG. 5, and a region surrounded by the light blocking film BM2 formed in a grid pattern is the pixel PIX. The light blocking film BM2 is arranged at a position overlapping with the insulating film IF1 in a grid pattern shown in FIG. 7. The light blocking films BM1 and BM2 include a blackened film, a black organic film, or a black conductive organic film obtained by combining the following metal materials and conductive layers. That is, the light blocking films BM1 and BM2 include metal films made of one or more kinds of metals selected from aluminum (Al), copper (Cu), silver (Ag), molybdenum (Mo), chromium (Cr), titanium (Ti), and tungsten (W). Alternatively, the light blocking films BM1 and BM2 include an alloy containing one or more kinds of metal materials selected from them. Alternatively, the light blocking films BM1 and BM2 are laminated bodies in which a plurality of conductive layers of these metal materials or an alloy containing one or more kinds of these materials are laminated.

The light blocking film BM2 is arranged so as to partition the boundary of a plurality of pixels. Since the light blocking film BM2 is arranged between adjacent pixels PIX, it is preferable that the line width Wbm2 of the light blocking film BM2 is thin from the viewpoint of improving the light transmittance of the display region DA. On the other hand, the light blocking film BM1 is arranged in the peripheral region PFA and is provided so as to make the boundary between the peripheral region PF1 and the peripheral region PF2 less conspicuous. Therefore, the line width Wbm1 of the light blocking film BM1 is preferably thicker than the line width Wbm2. In this way, the boundary between the peripheral region PF1 and the peripheral region PF2 can be surely made less conspicuous. However, if the line width Wbm1 becomes extremely thick, the light blocking film BM1 itself may be visually recognized. Considering these, for example, the line width Wbm1 of the light blocking film BM1 is preferably 0.1 mm or more and 0.5 mm or less. On the other hand, the line width Wbm2 of the light blocking film BM2 is smaller than 0.1 mm, although it depends on the size of the pixel PIX.

Further, in addition to the case where the light blocking film BM1 is composed of a single band-shaped pattern, it may be composed of a plurality of patterns arranged next to each other. As an example, assuming that the line width Wbm1 of the light blocking film BM1 is 0.3 mm, the light blocking film BM1 of 0.3 mm may be a band-shaped pattern having a width of 0.3 mm or may be a pattern composed of, for example, three patterns each having a width of 0.1 mm arranged side by side.

Although not shown, as a modification of the present embodiment, the light blocking film BM1 and the light blocking film BM2 may be separated from each other. In the example shown in FIG. 10 and FIG. 12, the light blocking film BM1 and the light blocking film BM2 are connected to the feeding portion CMF1 that supplies a common potential for driving the liquid crystal LQ (see FIG. 2). Specifically, the light blocking film BM2 is electrically connected to the feeding portion CMF1 via the light blocking film BM1 and the common potential wiring CML. The feeding portion CMF1 is arranged in at least the region near one of the four corners of the display region DA, in the peripheral region PFA outside the display region DA shown in FIG. 6. The feeding portion CMF1 is connected to the common potential drive circuit 45 shown in FIG. 5.

As shown in FIG. 12, when the light blocking film BM2 and the light blocking film BM1 are connected to the feeding portion CMF1 that supplies the common potential, the light blocking films BM1 and BM2 can be used as the path for supplying the common potential to the common electrode CE shown in FIG. 5. The common electrode CE is made of, for example, a transparent conductive material such as ITO (Indium Tin Oxide), but the resistance of the supply path of the common potential can be reduced by supplying a potential to the common electrode CE via the light blocking film BM2 containing a material such as a metal having higher electrical conductivity than the transparent conductive material.

Also, the structure in which the light blocking films BM1 and BM2 are electrically connected to the feeding portion CMF1 is preferable in the following point. That is, when the light blocking films BM1 and BM2 are made of a conductive material, there are the case where the light blocking films BM1 and BM2 are the electrically floating conductor patterns and the case where they electromagnetically affect surrounding circuits. When the light blocking films BM1 and BM2 are electrically connected to the feeding portion CMF1, the potentials of the light blocking films BM1 and BM2 are stabilized, so that electromagnetic adverse effects caused by the light blocking films BM1 and BM2 can be prevented.

The common potential wiring CML connects the feeding portion CMF1 and the light blocking films BM1 and BM2. As shown in FIG. 10, the feeding portion CMF1 is an annular body. The common potential wiring CML and feeding portion CMF1 do not have to be black, but are preferably made of the same material as the light blocking films BM1 and BM2. When the common potential wiring CML and the feeding portion CMF1 are black, the common potential wiring CML becomes less conspicuous. It is preferable that the common potential wiring CML and the feeding portion CMF1 are made of the same material as the light blocking film BM2 and formed in the same layer as the light blocking film BM2.

As shown in FIG. 13, an inter-substrate conductor CP is provided between a feeding portion CMF2 and the feeding portion CMF1. The inter-substrate conductor CP is a conductive pillar or a pillar made of a resin material containing conductive particles such as Au particles.

The feeding portion CMF2 is a part of an array substrate (substrate including the substrate 10 and the members formed on the substrate 10) with which the inter-substrate conductor CP is in contact. The common potential wiring CML is formed in a mesh pattern (grid pattern) in the peripheral region PFA on the side of the substrate 10. At a position overlapping with the opening of the annular body of the feeding portion CMF 1, the feeding portion CMF2 having a metal layer CMM that fills the mesh of the common potential wiring CML is provided. The metal layer CMM is made of the same material as the source line SL (see FIG. 5). The metal layer CMM and the common potential wiring CML are covered with a holding capacitor electrode HCE. A light transmitting conductive material layer CMX is provided on the holding capacitor electrode HCE. The light transmitting conductive material layer CMX is a circle having substantially the same diameter as the feeding portion CMF1. The light transmitting conductive material layer CMX is made of the same material as the pixel electrode PE (see FIG. 5). If the holding capacitor electrode HCE and the light transmitting conductive material layer CMX are the same light transmitting conductive material (for example, ITO), the feeding portion CMF2 has the light transmitting conductive material (for example, ITO) thicker than that of the surrounding region. Also, the metal layer CMM is covered with the light transmitting conductive material (for example, ITO). As a result, the contact resistance between the feeding portion CMF2 and the inter-substrate conductor CP is reduced.

In FIG. 10 and FIG. 11, an example of the structure of the boundary between the peripheral region PF1 and the peripheral region PF2 has been described. By applying the structure described with reference to FIG. 10 to FIG. 13, the boundary between the peripheral region PF1 and the peripheral region PF2 can be made less conspicuous regardless of the structure of the boundary between the peripheral region PF1 and the peripheral region PF3 shown in FIG. 6. However, it is preferable that the boundary between the peripheral region PF1 and the peripheral region PF3 shown in FIG. 6 also has the same structure. Hereinafter, the structure around the portion H in FIG. 6 will be briefly described.

Figure 14:
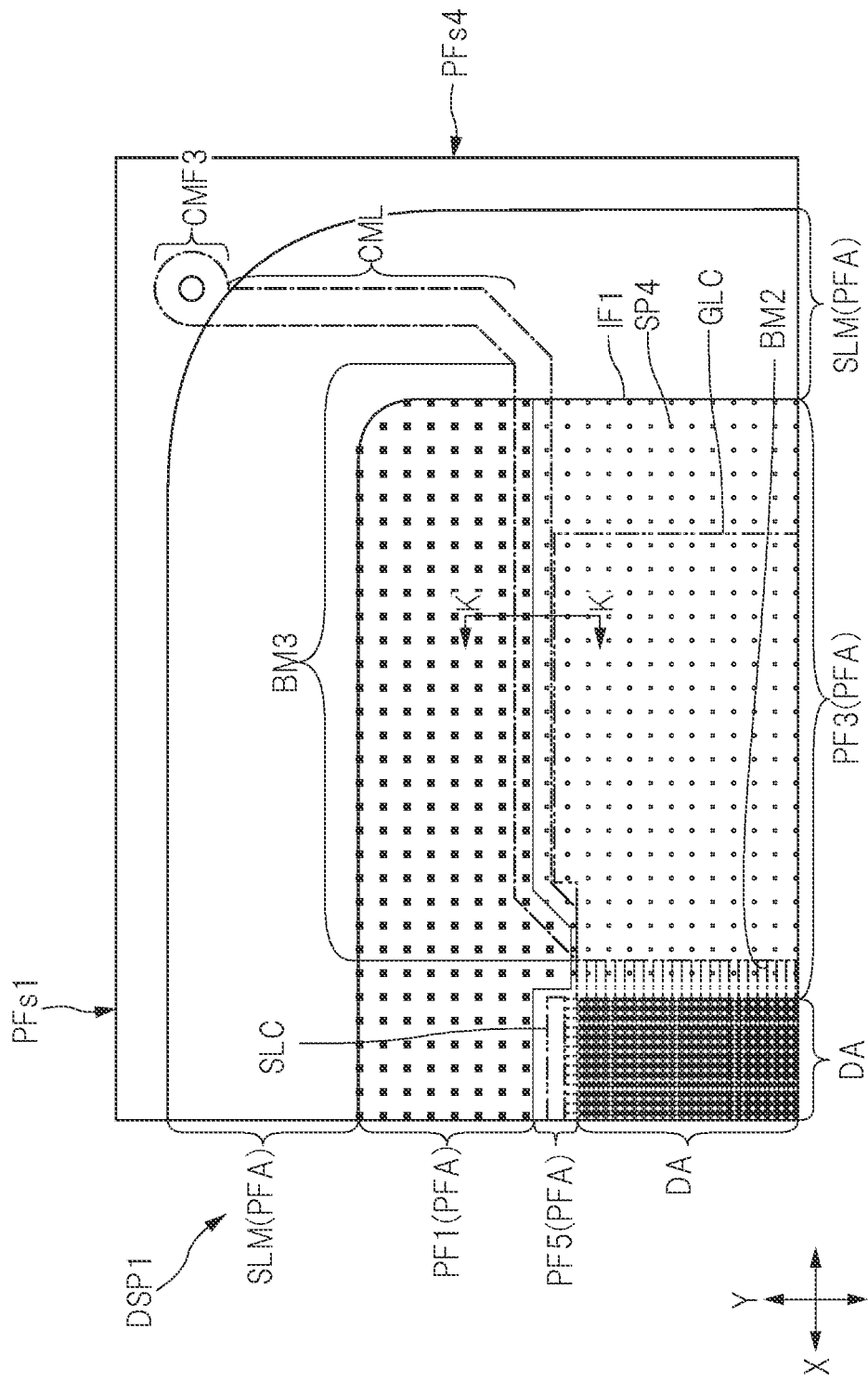
FIG. 14 is an enlarged plan view of a portion H in FIG. 6.
Figure 15:
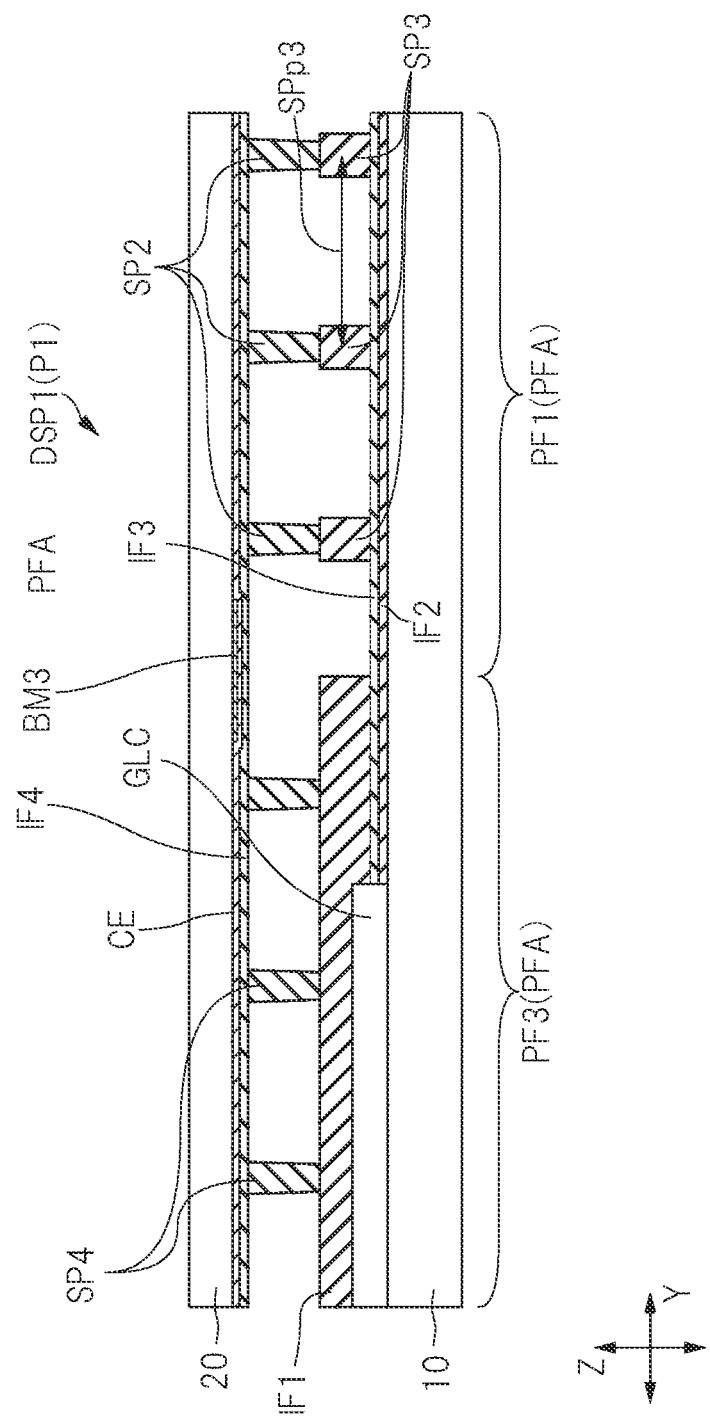
FIG. 15 is an enlarged cross-sectional view taken along the line K-K in FIG. 14.

FIG. 14 is an enlarged plan view of the portion H in FIG. 6. In FIG. 14, a feeding portion CMF3 that supplies a potential to a light blocking film BM3 and the light blocking film BM1 formed on the substrate 20 (see FIG. 3) and the light blocking film BM2 arranged in a grid pattern in the display region DA are shown by an alternate long and short dash line. Further, in FIG. 14, the circuit SLC and the circuit GLC are shown by an alternate long and two short dashes line. FIG. 15 is an enlarged cross-sectional view taken along the line K-K in FIG. 14.

As shown in FIG. 14, the peripheral region PFA of the display device DSP1 includes the peripheral region PF1 extending along the side PFs1 and the peripheral region PF3 extending along the side PFs4. The peripheral region PF1 is a region which includes a portion between the display region DA and the sealing portion SLM and a portion between the peripheral region PF2 and the sealing portion SLM and from which the insulating film IF1 is removed. The peripheral region PF3 is a region arranged between the display region DA and the sealing portion SLM. In the peripheral region PF3, the circuit GLC connected to the plurality of gate lines (signal wiring) GL (see FIG. 1) is arranged, and the insulating film IF1 covering the circuit GLC is formed. The circuit GLC is, for example, the gate drive circuit 43 (see FIG. 5), a test circuit, a protection circuit, a pixel electrode selection circuit, or the like. When the circuit GLC connected to the plurality of gate lines GL is arranged in the peripheral region PFA as described above, it is preferable that the insulating film IF1 covering the circuit GLC is provided from the viewpoint of protecting the circuit GLC.

In the case of such a structure, by making the boundary between the peripheral region PF1 and the peripheral region PF3 shown in FIG. 14 less conspicuous as in the boundary between the peripheral region PF1 and the peripheral region PF2 described with reference to FIG. 10, the background recognition performance of the display device DSP1 which is a transparent display device can be improved.

As shown in FIG. 15, the light blocking film BM3 is formed on the substrate 20 of the display device DSP1. The light blocking film BM3 is arranged so as to straddle the peripheral region PF1 and the peripheral region PF3. Further, as shown in FIG. 14, the light blocking film BM3 extends linearly along the extending direction (X direction in FIG. 14) of the boundary between the peripheral region PF1 and the peripheral region PF3. In other words, in the perspective plan view seen from the side of the substrate 20 (that is, plan view corresponding to FIG. 14), the boundary between the peripheral region PF1 and the peripheral region PF3 overlaps with the light blocking film BM3.

By arranging the light blocking film BM3 along the boundary between the peripheral region PF1 and the peripheral region PF3, the light around the boundary is blocked by the light blocking film BM3. As a result, the boundary between the peripheral region PF1 and the peripheral region PF3 can be made less conspicuous. Since the material constituting the light blocking film BM3, the line width, and the electrical connection structure with the feeding portion CMF1 are the same as those of the light blocking film BM1 described with reference to FIG. 10 to FIG. 13, duplicate description will be omitted.

A person having ordinary skill in the art can make various modifications and corrections within a range of the idea of the present invention, and it is interpreted that the modifications and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to a display device and an electronic equipment in which the display device is incorporated.

What is claimed is:

1. A display device comprising:
   a display region;
   a peripheral region around the display region;
   a first substrate;
   a second substrate facing the first substrate;
   a liquid crystal layer arranged between the first substrate and the second substrate and containing liquid crystal;
   a plurality of signal wirings formed on the first substrate and transmitting a drive signal for driving the liquid crystal;
   a first insulating film arranged between the first substrate and the second substrate and covering the plurality of signal wirings;
   a plurality of first spacer members arranged between the first insulating film and the second substrate in the display region and maintaining a gap between the first substrate and the second substrate;
   a sealing portion provided in the peripheral region between the first substrate and the second substrate to seal the liquid crystal layer; and
   a liquid crystal supply portion provided at a part of the sealing portion and interconnecting an outside of the sealing portion and the display region,
   wherein, in a plan view seen from a side of the second substrate, the peripheral region has a first side, a second side on an opposite side of the first side, a third side intersecting with the first side, and a fourth side on an opposite side of the third side,
   wherein the liquid crystal supply portion is provided along the first side of the peripheral region,
   wherein the peripheral region includes:
      a first peripheral region which includes a region between the display region and the sealing portion and is arranged so as to extend along the first side and from which the first insulating film is removed; and
      a second peripheral region which includes a region between the display region and the sealing portion and is arranged so as to extend along the third side and in which a first circuit connected to the plurality of signal wirings is arranged and the first insulating film covering the first circuit is formed,
   wherein each of the first peripheral region and the second peripheral region has transmission characteristics for visible light,
   wherein a first light blocking film formed on the second substrate extends from the sealing portion to the display region through the boundary between the first peripheral region and the second peripheral region,
   wherein a second light blocking film in a grid pattern is formed on the second substrate at a position overlapping with the first insulating film in the display region,
   wherein one end of the first light blocking film is connected to the second light blocking film,
   wherein a length of the first light blocking film from the sealing portion to the display region is longer than the maximum line width of the first light blocking film, and
   wherein the first light blocking film is formed on a part of the first peripheral region and on a part of the second peripheral region.

2. The display device according to claim 1, wherein the insulating film is formed in a grid pattern in the display region.

3. The display device according to claim 2, wherein a line width of the first light blocking film is wider than a line width of the second light blocking film.

4. The display device according to claim 3, wherein the first light blocking film and the second light blocking film are connected to a feeding portion that supplies a common potential for driving the liquid crystal.

5. The display device according to claim 1, wherein the peripheral region further includes a third peripheral region which includes a region between the display region and the sealing portion and is arranged so as to extend along the fourth side and in which a second circuit connected to the plurality of signal wirings is arranged and the first insulating film covering the second circuit is formed,
   wherein the third peripheral region has transmission characteristics for visible light,
   wherein a third light blocking film formed on the second substrate extends from the sealing portion to the display region through the boundary between the first peripheral region and the second peripheral region,
   wherein one end of the third light blocking film is connected to the second light blocking film,
   wherein a length of the third light blocking film from the sealing portion to the display region is longer than the maximum line width of the third light blocking film, and
   wherein the third light blocking film is formed on a part of the first peripheral region and on a part of the third peripheral region.

6. The display device according to claim 1, wherein the first circuit is a test circuit or a protection circuit.

7. The display device according to claim 1, wherein the first light blocking film is composed of a band-shaped pattern, and
   wherein each of the first peripheral region and the second peripheral region has a background recognition performance.

* * * * *